United States Patent
Zhang (10) Patent No.: US 7,982,797 B2
(45) Date of Patent: Jul. 19, 2011

(54) DETECTING BLOCKS OF COMMERCIAL CONTENT IN VIDEO DATA

(75) Inventor: Tong Zhang, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1339 days.

(21) Appl. No.: 11/479,405

(22) Filed: Jun. 30, 2006

(65) Prior Publication Data

US 2008/0127244 A1    May 29, 2008

(51) Int. Cl.
*H04N 7/12* (2006.01)
*G06F 13/00* (2006.01)

(52) U.S. Cl. .................... 348/423.1; 725/42

(58) Field of Classification Search .......... 348/423.1, 348/722; 375/240.16; 455/418; 386/46; 725/42

See application file for complete search history.

(56) References Cited

U.S. PATENT DOCUMENTS

| | | | |
|---|---|---|---|
| 5,692,093 A * | 11/1997 | Igguiden et al. | 386/46 |
| 6,100,941 A | 8/2000 | Dimitrova et al. | |
| 6,615,039 B1 * | 9/2003 | Eldering | 455/418 |
| 6,704,797 B1 | 3/2004 | Fields et al. | |
| 6,714,594 B2 * | 3/2004 | Dimitrova et al. | 375/240.16 |
| 7,170,566 B2 * | 1/2007 | McGee et al. | 348/722 |
| 2003/0112261 A1 | 6/2003 | Zhang | |
| 2003/0117530 A1 | 6/2003 | McGee et al. | |
| 2003/0123841 A1 | 7/2003 | Jeannin | |
| 2003/0202772 A1 | 10/2003 | Dow et al. | |
| 2003/0210889 A1 | 11/2003 | Engle et al. | |
| 2005/0195334 A1 | 9/2005 | Yeh et al. | |

* cited by examiner

*Primary Examiner* — Gims S Philippe (57) ABSTRACT

Systems and methods of detecting blocks of commercial content in video data are described. In one aspect, visual parameter values and audio parameter values are extracted from the video data. Visual boundary events, audio boundary events, and commercial content transition events are detected in the video data. Candidate commercial blocks of consecutive commercial content are detected in the video data from a combination of the detected visual boundary events and the detected audio boundary events. Each of the candidate commercial blocks is defined between respective candidate starting and ending boundary points. Ones of the starting and ending boundary points of the candidate commercial blocks are adjusted based on occurrence of one or more of the detected commercial content transition events within temporal windows respectively encompassing the starting and ending points.

20 Claims, 6 Drawing Sheets

DETECTING BLOCKS OF COMMERCIAL CONTENT IN VIDEO DATA

BACKGROUND

Viewers oftentimes use video cassette recorders (VCRs) and digital video recorders (DVRs) to record television, cable, and satellite video broadcasts for later viewing. Such broadcasts typically include segments of program content separated by blocks of one or more consecutive segments of commercial content (e.g., non-program content, such as advertising, station identification, previews, and the like).

Viewers typically prefer to watch consecutive segments of program content continuously without interruption by any intervening segments of commercial content. To this end, various technologies have been developed to enable viewers to skip over commercial content in broadcast video. For example, VCRs and DVRs typically include fast forward functionality that allows viewers to advance quickly through commercial content in recorded broadcast video data. In addition, recently developed VCRs and DVRs include automatic commercial detection technology that is able to distinguish commercial content from program content based on audiovisual features of the broadcast video.

At least in the United States, each segment of commercial content typically is bounded by one or more black video frames and accompanying periods of silence. As a result, many automatic commercial detection approaches rely at least in part on the detection of black video frames, either alone or in combination with accompanying silence, to detect the boundaries of each individual commercial segment. Some automatic commercial detection approaches additionally include functionality for confirming whether a commercial has occurred based on an analysis of the video data. In one such automatic commercial detection system, candidate commercial segments are identified based on the detection of a black video frame and an analysis of frame cut parameters that are derived from the video data. This system then relies on one or more of logo detection, commercial signature detection, brand name detection, detection of similar features located within a specified period of time before a frame being analyzed, and character detection to confirm that each of the identified candidate commercial segments does indeed correspond to a commercial segment.

These prior automatic commercial detection approaches implicitly assume that black frame detection, either alone or in combination with silence detection, can accurately detect the boundaries between commercial content and program content. Oftentimes, however, it is very difficult to detect each black frame and each silent period with high accuracy. Such difficulty is increased when broadcasters actively seek to thwart the ability of automatic commercial detection systems to detect the transitions between commercial content and video content. For example, broadcasters in some countries are replacing the black video frames at the boundaries of commercial segments with frames of a uniform non-black color, such as blue or white. As a result, prior automatic commercial detection systems tend to produce imperfect commercial segmentation results. Depending on the viewer, such results may be sufficiently unsatisfactory (e.g., when the end of a program is labeled incorrectly as commercial content and therefore not recorded) that they may abandon the use of such technology.

What are needed are systems and methods that are capable of detecting the boundaries of commercial content and program content in video data with high accuracy.

SUMMARY

In one aspect, the invention features a video data processing method in accordance with which visual parameter values and audio parameter values are extracted from the video data. Visual boundary events that are associated with respective ones of the extracted visual parameter values that satisfy at least one visual boundary condition are detected in the video data. Audio boundary events that are associated with respective ones of the extracted audio parameter values that satisfy at least one audio boundary condition are detected in the video data. Commercial content transition events that are associated with respective ones of the extracted visual and audio parameter values that satisfy at least one condition that distinguishes commercial type content from program type content are detected in the video data. Candidate commercial blocks of consecutive commercial content are detected in the video data from a combination of the detected visual boundary events and the detected audio boundary events. Each of the candidate commercial blocks is defined between respective candidate starting and ending boundary points. Ones of the starting and ending boundary points of the candidate commercial blocks are adjusted based on occurrence of one or more of the detected commercial content transition events within temporal windows respectively encompassing the starting and ending points.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale. Elements shown with dashed lines are optional elements in the illustrated embodiments incorporating such elements.

I. Introduction

Figure 1:
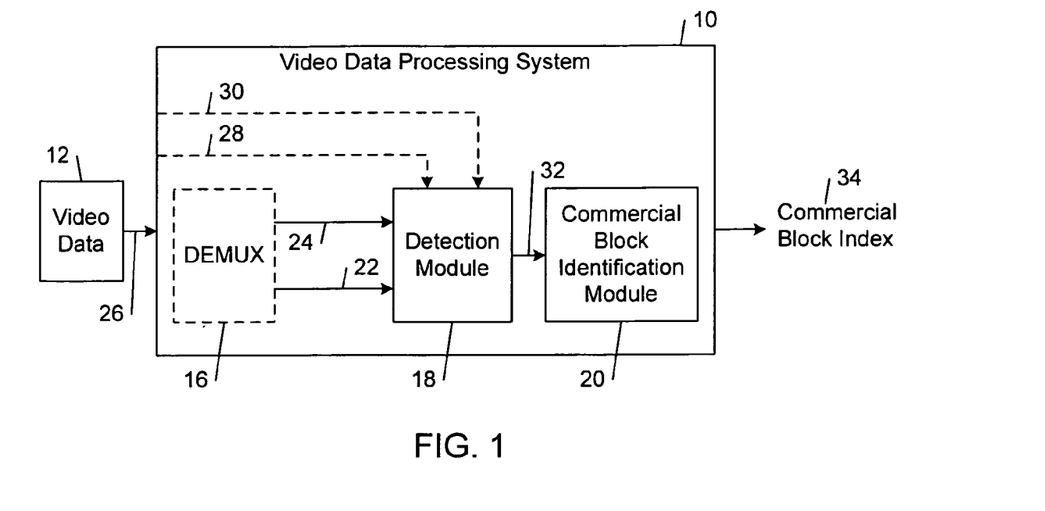
FIG. 1 is a block diagram of an embodiment of a video data processing system.

FIG. 1 shows an embodiment of a video processing system 10 that is capable of detecting the boundaries of commercial content and program content in video data 12 with high accuracy. The video processing system 10 includes an optional demultiplexer 16, a detection module 18, and a commercial block identification module 20.

In general, the video data 12 includes visual data 22 (e.g., video frames) and audio data 24. The video data processing system 10 may receive the visual data 22 and the audio data 24 as separate data signals or a single multiplex video data signal 26, as shown in FIG. 1. When the video data 12 is received as a single multiplex signal 26, the demultiplexer (DEMUX) 16 separates the visual data 22 and the audio data 24 from the single multiplex video data signal 26 and passes the separated visual data 22 and audio data 24 to the detection module 18. When the visual data 22 and the audio data 24 are received as separate signals 28, 30, these signals 28, 30 are passed directly to the detection module 18.

The detection module 18 extracts parameter values from the visual data 22 and the audio data 24 and detects various events in the video data 12 based on the extracted parameter values. The detection module 18 passes an index 32 of the detected events to the commercial block identification module 20. The commercial block identification module 20 determines an index 34 of commercial blocks within the video data 12 based on the event index 32 that is received from the detection module 18. The commercial block index 34 contains pointers to the starting and ending points of blocks of one or more segments (or episodes) of commercial content that are detected between segments of program content in the video data 12.

The video processing system 10 may be used in a wide variety of applications, including video recording devices (e.g., VCRs and DVRs), video editing devices, and media asset organization and retrieval systems. In some application environments, the commercial block index 34 may be used to navigate to transition points between the program content and the commercial content in the video data 12. In other application environments, the commercial block index 30 may be used to generate, for example, commercial-free summaries of the program content in the video data 12 and program-free summaries of the commercial content in the video data 12.

In general, the video processing system 10 (including the detection module 18 and the commercial block identification module 20) is not limited to any particular hardware or software configuration, but rather it may be implemented in any computing or processing environment, including in digital electronic circuitry or in computer hardware, firmware, device driver, or software. For example, in some implementations, the image processing system 10 may be embedded in the hardware of any one of a wide variety of electronic devices, including desktop and workstation computers, video recording devices (e.g., VCRs and DVRs), and a cable or satellite set-top box capable of decoding and playing paid video programming. In some implementations, computer process instructions for implementing the image processing system 10 and the data it generates are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable hard disks, magneto-optical disks, and CD-ROM.

II. Detecting Blocks of Commercial Content in Video Data

A. Overview

Figure 2:
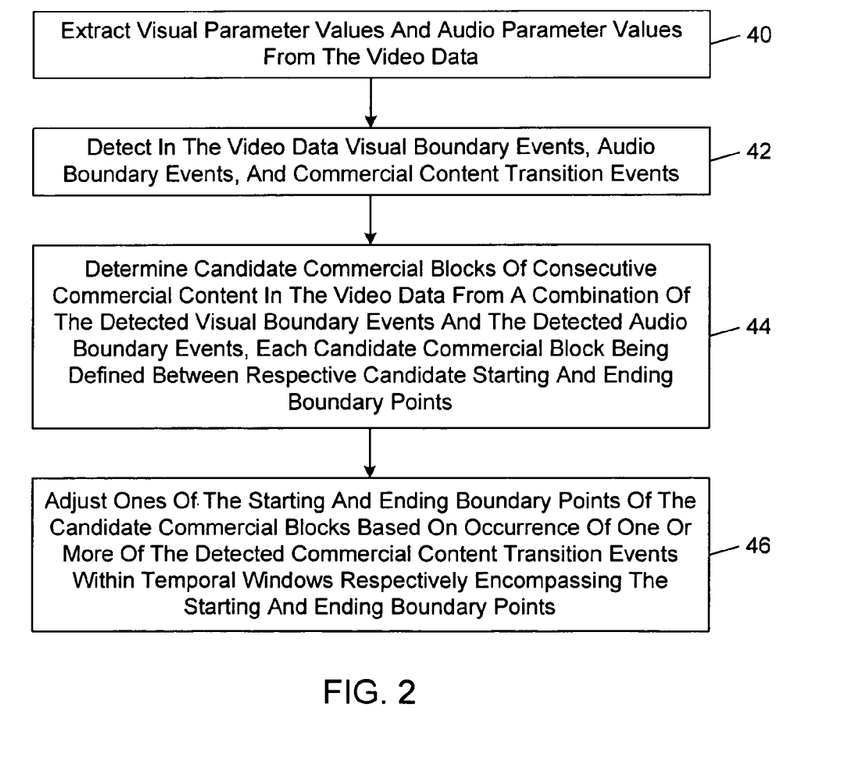
FIG. 2 is a flow diagram of an embodiment of a video data processing method.

FIG. 2 shows an embodiment of a method by which the video processing system 10 generates the commercial block index 14.

In accordance with this method, the detection module 18 extracts visual parameter values and audio parameter values from the video data 12 (FIG. 2, block 40). The detection module 18 extracts the visual parameter values from the visual data 22, 28 and extracts the audio parameter values from the audio data 24, 30. Exemplary types of visual parameter values include brightness parameter values, sharpness parameter values, color layout parameter values, color histogram values, and shot cut rate parameter values. Exemplary types of audio parameters include audio energy parameter values, audio amplitude parameter values, audio spectrum parameter values, and speech speed parameter values.

The detection module 18 detects in the video data 12 visual boundary events, audio boundary events, and commercial content transition events based on the extracted parameter values (FIG. 2, block 42). The visual boundary events are associated with respective ones of the extracted visual parameter values that satisfy at least one visual boundary condition. In the embodiments illustrated herein, the visual boundary events correspond to the occurrence of detected blank video frames in the video data 12. The audio boundary events are associated with respective ones of the extracted audio parameter values that satisfy at least one audio boundary condition. In the illustrated embodiments, the audio boundary events correspond to the occurrence of detected silence in the video data 12. The commercial content transition events are associated with respective ones of the extracted visual and audio parameter values that satisfy at least one condition that distinguishes commercial type content from program type content. In the illustrated embodiments, the commercial content transition events correspond to the occurrences of one or more of the following detected events in the video data 12: static video frames; high shot cut rate transitions; sudden changes in audio content; and sudden changes in speech speed.

The commercial block identification module 20 determines candidate commercial blocks of consecutive commercial content in the video data 12 from a combination of the detected visual boundary events and the detected audio boundary events (FIG. 2, block 44). Each of the candidate commercial blocks is defined between respective candidate starting and ending boundary points.

The commercial block identification module 20 adjusts ones of the starting and ending boundary points of the candidate commercial blocks based on occurrence of one or more of the detected commercial content transition events within temporal windows respectively encompassing the starting and ending points (FIG. 2, block 46). The commercial block identification module 20 stores the adjusted starting and ending boundary points of the resulting commercial blocks in the commercial block index 34.

B. Exemplary Execution of Commercial Block Detection Method

1. Detecting Candidate Commercial Blocks

FIGS. 3A-3D diagrammatically show an exemplary execution of an embodiment of a method of determining candidate commercial blocks in accordance with the method shown in FIG. 2.

Figure 3A:
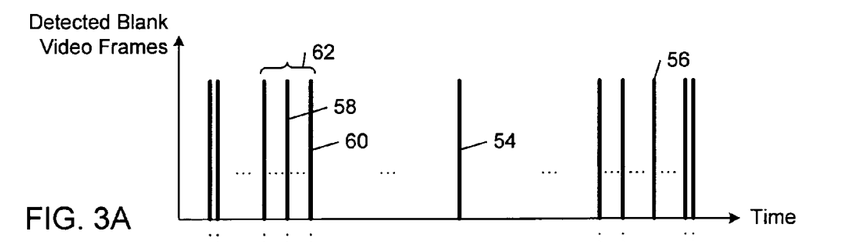
FIG. 3A is a graph of detected visual boundary events corresponding to blank video frames plotted as a function of time.

FIG. 3A is a graph of detected visual boundary events corresponding to blank video frames plotted as a function of time. Each occurrence of a detected blank video frame is represented by a respective impulse located at the time of occurrence. In this example, eleven occurrences of blank video frames were detected in the video data 12 during the illustrated video data time frame of interest. In the illustrated example, the first and last pairs of blank video frames (i.e., the first and second blank video frames and the tenth and eleventh blank video frames) consist of consecutive video frames, and the remaining blank video frames are separated by intervening video frames, as indicated by the dotted lines. Two or more consecutive video frames that are detected as blank frames may be treated together as a single visual boundary event.

Figure 3B:
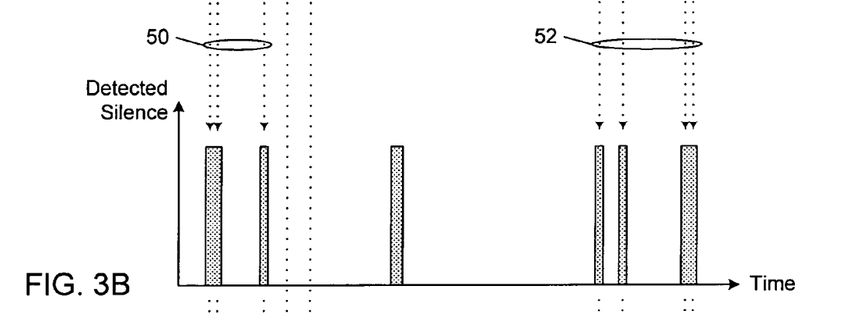
FIG. 3B is a graph of detected audio boundary events corresponding to silence plotted as a function of time.

FIG. 3B is a graph of detected audio boundary events corresponding to silence plotted as a function of time. Each occurrence of a detected period of silence is represented by a respective rectangle with starting and ending points located at the boundaries of the period during which silence was detected. In this example, eight occurrences of silence were detected in the video data 12 during the illustrated video data time frame of interest.

Figure 3C:
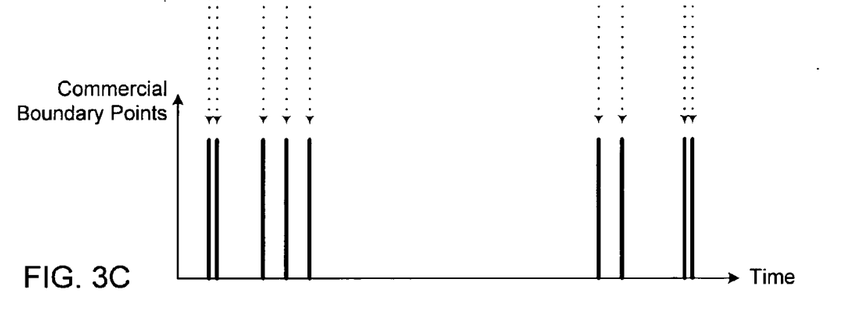
FIG. 3C is a graph of commercial boundary events derived from a combination of the visual and audio boundary events shown in FIGS. 3A and 3B plotted as a function of time.

FIG. 3C is a graph of commercial boundary events that were derived from a combination of the detected visual and audio boundary events shown in FIGS. 3A and 3B plotted as a function of time. In accordance with this embodiment, the combination involves selecting as commercial boundary points the ones of the detected blank video frames that coincide with respective ones of the detected silence periods. The arrows 50, 52 show the coincidences between the detected blank video frames in FIG. 3A and the detected silence periods shown in FIG. 3B. As shown in FIGS. 3A-3C, the detected blank video frames 54 and 56 do not coincide with any of the detected silence periods and therefore are not selected as commercial boundary points.

In addition to selecting commercial boundary points from the combination of the detected visual and audio boundary events, the commercial block identification module 20 selects as commercial boundary points consecutive blank frames in series that are separated by periods that are likely to correspond to the lengths of individual segments of commercial content. It has been observed that individual segments of commercial content oftentimes have lengths that are approximately an integer multiple of fifteen seconds. In accordance with this observation, some embodiments of the commercial block identification module 20 label as commercial boundary points three or more consecutive ones of the detected visual boundary events that correspond to two or more adjacent pairs of blank video frames, where the blank video frames in each pair are separated by a respective period that is approximately (±15%) an integer multiple of fifteen seconds in length.

The blank video frames 58, 60 shown in FIG. 3A do not coincide with any of the detected silence periods shown in FIG. 3B. These blank video frames 58, 60 are, however, part of a series 62 of blank video frames in which adjacent ones of the blank video frames are separated by respective periods that are approximately an integer multiple of fifteen seconds in length. Thus, although the blank video frames 58, 60 do not coincide with any of the detected silence periods, the commercial block identification module 20 still labels these blank video frames 58, 60 as commercial block boundary points, as shown in FIG. 3C.

After the commercial boundary points have been selected, the commercial block identification module 20 clusters ones of the identified commercial boundary points into the candidate commercial blocks. In some embodiments, the commercial block identification module 20 merges into respective ones of the candidate commercial blocks periods in the video data 12 between adjacent ones of the identified commercial boundary points based on at least one temporal clustering threshold. In this process, the commercial boundary points are considered in sequence. Whenever the temporal distance between the current commercial boundary point and the adjacent preceding commercial boundary point is within the temporal clustering threshold, the current commercial boundary point is clustered into the same candidate commercial block as the preceding commercial boundary point. If the temporal distance separating current commercial boundary point from the preceding commercial boundary point is greater than the temporal clustering threshold, the current commercial boundary point is incorporated into a new candidate commercial block. The temporal clustering threshold may be determined empirically. In one exemplary embodiment, the temporal clustering threshold is in the range of two to three minutes.

Figure 3D:
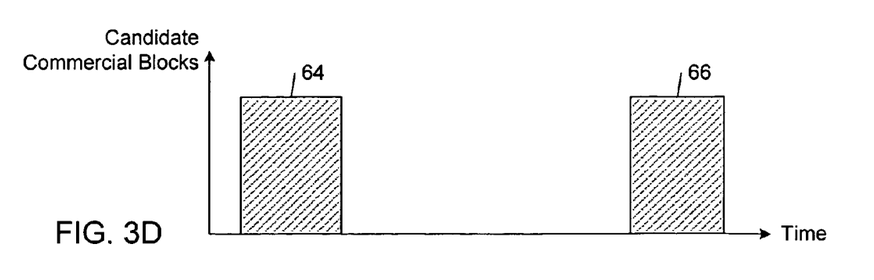
FIG. 3D is a graph of candidate commercial blocks plotted as a function of time.

FIG. 3D shows two candidate commercial blocks 64, 66 that were determined as a result of clustering the exemplary set of commercial boundary points that are shown in FIG. 3C.

Figure 4:
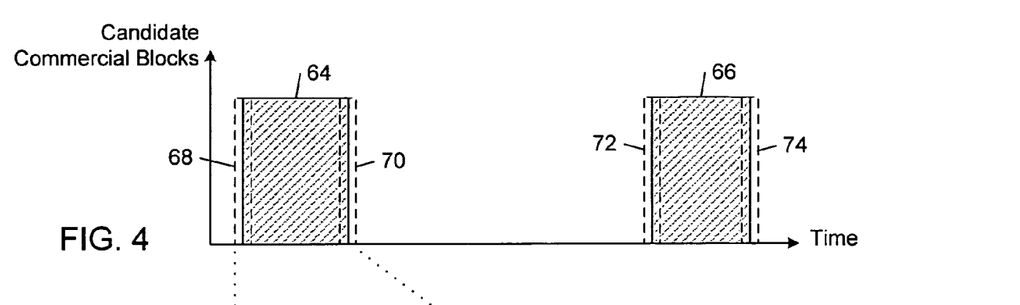
FIG. 4 is a graph of the candidate commercial blocks shown in FIG. 3D plotted as a function of time and temporal windows positioned in relation to the starting and ending points of the candidate commercial blocks.

2. Adjusting the Starting and Ending Boundary Points of Candidate Commercial Blocks FIG. 4 shows the candidate commercial blocks 64, 66 shown in FIG. 3D together with four temporal windows 68, 70, 72, 74 that are positioned in relation to the starting and ending boundary points of the candidate commercial blocks 64, 66. The temporal windows 68-74 define respective adjustment zones about the starting and ending boundary points. In general, the temporal windows 68-74 may be positioned adjacent to the starting and ending boundary points or they may be positioned over timeframes that symmetrically or asymmetrically cover the starting and ending boundary points. In the illustrated embodiments, each of the temporal windows is centered about a respective one of the starting and ending boundary points and has a length of approximately (±15%) fifteen to thirty seconds.

Figure 5:
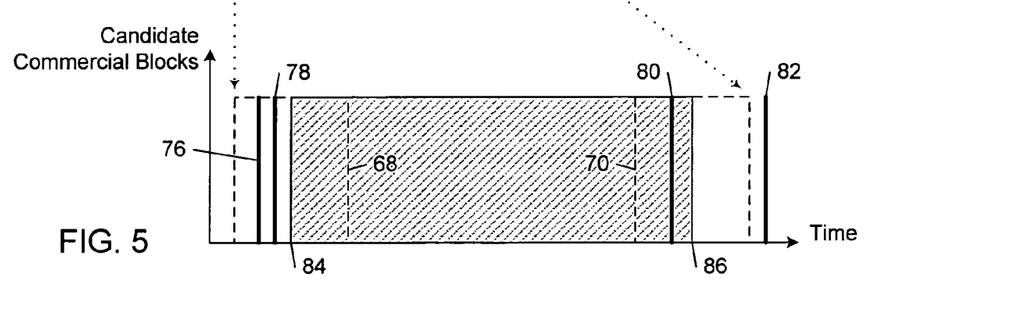
FIG. 5 is a graph of one of the candidate commercial blocks shown in FIG. 4 together with detected commercial content transition events plotted as a function of time.

FIG. 5 shows the first candidate commercial block 64 shown in FIG. 4 along with four commercial content transition events 76, 78, 80, 82 that were detected in the video data 12 by the detection module 16. As explained in detail below, the commercial block identification module 20 adjusts the starting and ending points 84, 86 of the candidate commercial block 64 based on the occurrence of one or more commercial content transition events within the temporal windows 68, 70.

Figure 6:
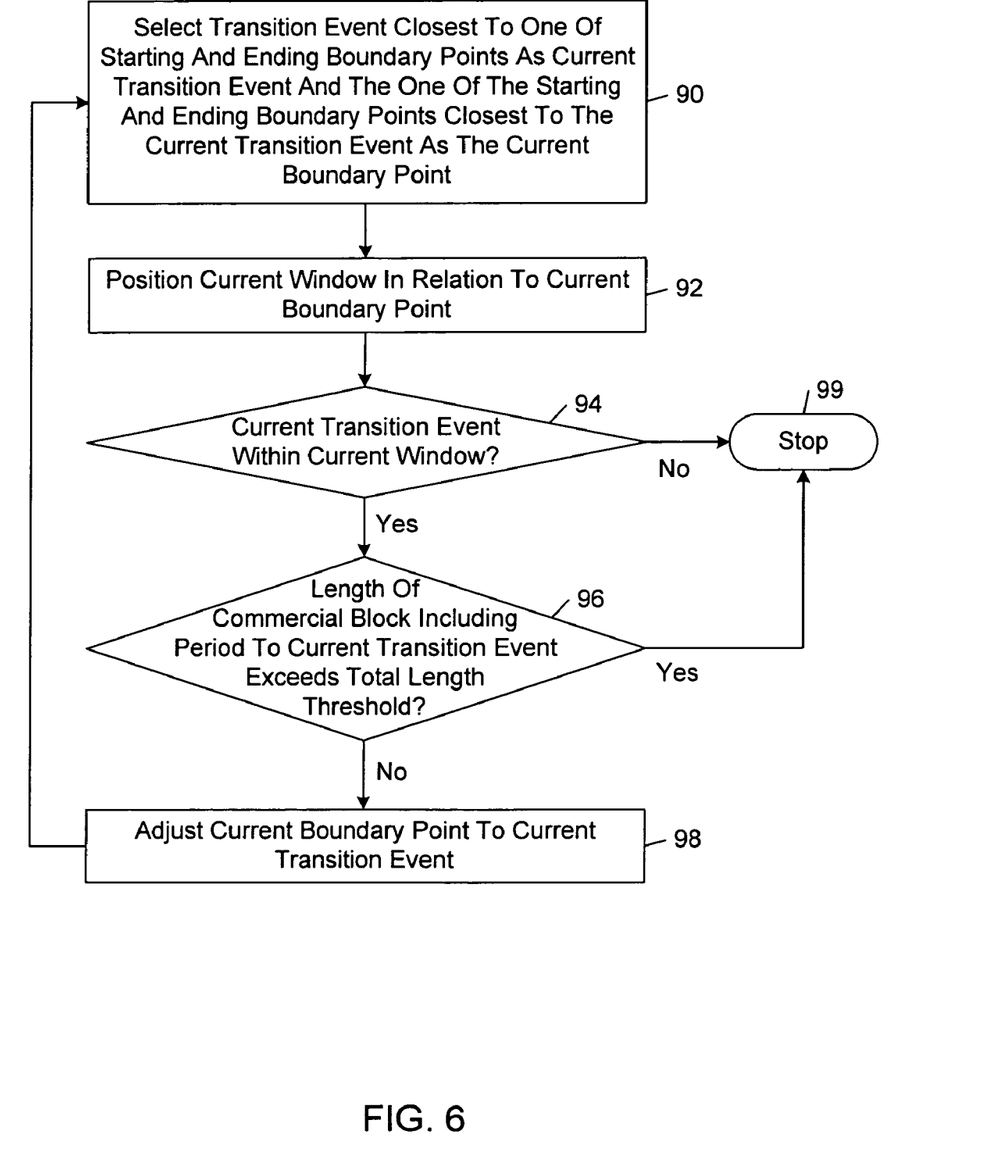
FIG. 6 is a flow diagram of an embodiment of a method of adjusting ones of the starting and ending boundary points of candidate commercial blocks.

FIG. 6 shows an embodiment of a method by which the commercial block identification module 20 adjusts ones of the starting and ending boundary points of candidate commercial blocks. FIGS. 7A-7D diagrammatically show an exemplary execution of the method of FIG. 6 applied to the candidate commercial block 64 shown in FIG. 5.

Figure 7A:
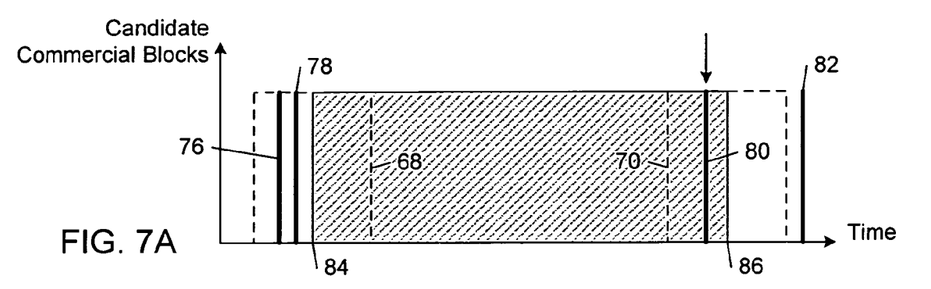
FIGS. 7A-7D are graphs of the candidate commercial blocks plotted as a function of time at different stages of the method shown in FIG. 6.
Figure 7B:
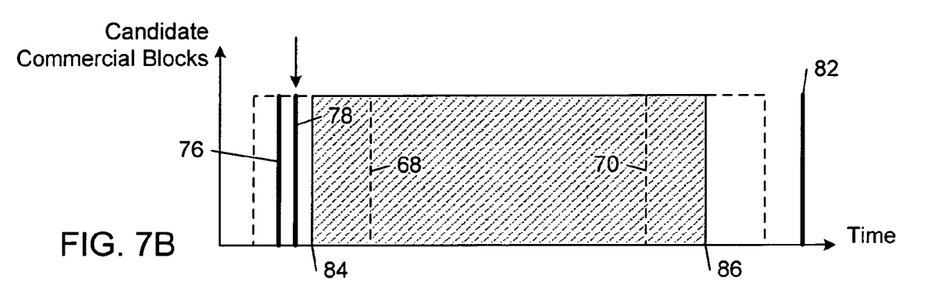
Figure 7C:
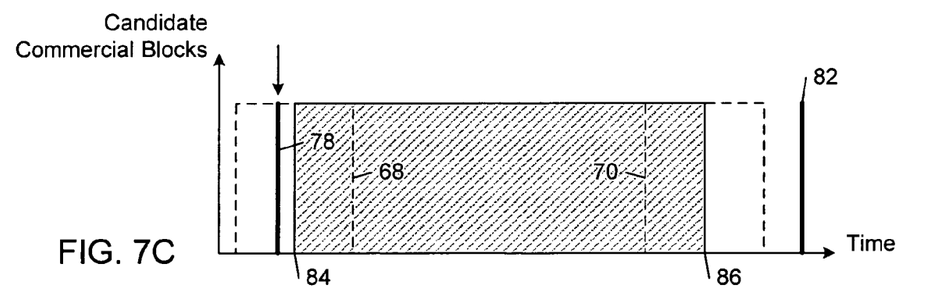
Figure 7D:
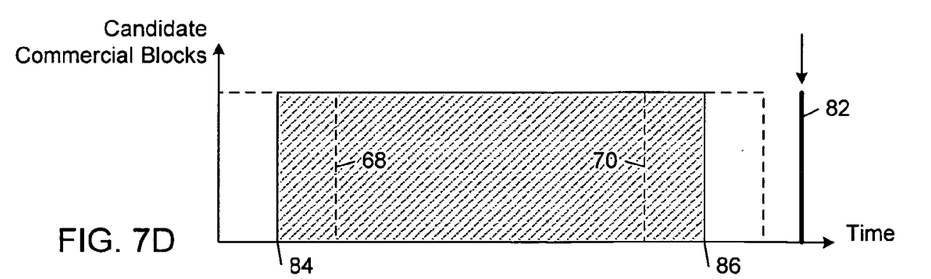

In accordance with this method, the commercial block identification module 20 selects a commercial content transition event that is closest to one of the starting and ending boundary points 84, 86 as the current transition event and the one of the starting and ending boundary points 84, 86 that is closest to the current transition even as the current boundary point (FIG. 6, block 90). In FIG. 7A, the commercial content transition event 80 is the transition event that is closest to one of the starting and ending boundary points 84, 86. In this case, the commercial block identification module 20 selects the commercial content transition event 80 as the current transition event and the ending point 86 as the current boundary point.

The commercial block identification module 20 positions the current window in relation to the current boundary point (FIG. 6, block 92). In FIG. 7A, the current window is the temporal window 70, which is centered with respect to the ending boundary point 86.

The commercial block identification module 20 determines whether the current transition event is within the current window (FIG. 6, block 94). Since the commercial content transition event 80 is within the current window 70, the commercial block identification module 20 proceeds to the next step.

The commercial block identification module 20 determines whether the length of the commercial block including the period to the current transition event is greater than a total length threshold (FIG. 6, block 96). The total length threshold corresponds to the total permissible length of a valid commercial block. The total length threshold may be empirically determined. In some embodiments, the total length threshold is in the range of ten to fifteen minutes. In the instant example, it is assumed that the length of the commercial block 64 including the period to the current transition event 80 is within the total length threshold.

In response to a determination that the total length threshold would not be exceeded, the commercial block identification module 20 adjusts the current boundary point to the current transition event (FIG. 6, block 98). In the instant case, the ending boundary point 86 is moved to encompass the occurrence time of the commercial transition event 80, and the expanded length is an integer multiple of fifteen seconds.

The commercial block identification module 20 repeats the process (FIG. 6, blocks 90-98) until either the current transition event is outside of the current window (FIG. 6, block 94) or the length of the commercial block including the period to the current transition event exceeds the total length threshold (FIG. 6, block 96).

In the second iteration of the boundary point adjustment process, the commercial block identification module 20 selects the commercial content transition event 78 as the current transition event and the beginning point 84 as the current boundary point (FIG. 6, block 90). The current window is the temporal window 68, which is centered with respect to the beginning boundary point 84 (FIG. 6, block 92). The commercial content transition event 78 is within the temporal window 68 (FIG. 6, block 94). Since the total length threshold would not be exceeded (FIG. 6, block 96), the commercial block identification module 20 adjusts the beginning boundary point 84 to encompass the commercial content transition event 78 (FIG. 6, block 98), and the expanded length is an integer multiple of fifteen seconds.

In the third iteration of the boundary point adjustment process, the commercial block identification module 20 selects the commercial content transition event 76 as the current transition event and the beginning point 84 as the current boundary point (FIG. 6, block 90). The current window is the temporal window 68, which is re-centered with respect to the beginning boundary point 84 (FIG. 6, block 92). The commercial content transition event 76 is within the temporal window 68 (FIG. 6, block 94). Since the total length threshold would not be exceeded (FIG. 6, block 96), the commercial block identification module 20 adjusts the beginning boundary point 84 to encompass the commercial content transition event 76 (FIG. 6, block 98), and the expanded length is an integer multiple of fifteen seconds.

In the fourth iteration of the boundary point adjustment process, the commercial block identification module 20 selects the commercial content transition event 82 as the current transition event and the ending point 86 as the current boundary point (FIG. 6, block 90). The current window is the temporal window 70, which is re-centered with respect to the ending boundary point 86 (FIG. 6, block 92). Since the commercial content transition event 82 is outside the temporal window 70 (FIG. 6, block 94), the commercial block identification module 20 terminates the boundary point adjustment process (FIG. 6, block 99).

The times of starting and ending boundary points at the end of the boundary point adjustment process define the commercial block that is identified by the commercial block identification module 20. The commercial block identification module 20 stores these times in the commercial block index 34.

III. Exemplary Methods of Detecting Boundary Events and Commercial Content Transition Events A. Introduction In general, there are a wide variety of different ways to detect the visual boundary events, the audio boundary events, and the commercial content transition events that are described herein. The following event detection methods merely illustrate the detection methods that are implemented by some embodiments in accordance with the invention.

B. Detecting Visual Boundary Events

In some of the embodiments that are described in detail above, the visual boundary events correspond to the occurrence of blank video frames in the video data 12. In general, the blank video frames may consist of uniformly colored video frames. The blank video frames that broadcasters frequently insert into the video data before and after each commercial segment typically are uniformly black in color.

In some embodiments, the detection module 18 detects blank video frames in the video data 12 as follows.

The detection module 18 extracts brightness values corresponding to the average luminance from each frame of the visual data 22 in accordance with equation (1):

$$brightness = \frac{1}{N \cdot M} \cdot \left( \sum_{i=1}^{N} \sum_{j=1}^{M} L(i, j) \right) \quad (1)$$

where $L(i, j)$ is the luminance of the pixel at the frame coordinate $(i, j)$ and N and M are the height and width of the frame, respectively.

The detection module 18 extracts sharpness values from each frame of the visual data 22 by applying an edge filter to each frame and determining the sharpness values from the edge filter output values. In some embodiments, the detection module 18 applies the following edge filter to each frame of the visual data 22:

$$E_x(i, j) = \begin{array}{l} (L(i-1, j+1) - L(i-1, j-1))/8 + \\ (L(i, j+1) - L(i, j-1))/4 + \\ (L(i+1, j+1) - L(i+1, j-1))/8 \end{array} \quad (2)$$

$$E_y(i, j) = \begin{matrix} (L(i+1, j-1) - L(i-1, j-1))/8 + \\ (L(i+1, j) - L(i-1, j))/4 + \\ (L(i+1, j+1) - L(i-1, j+1))/8 \end{matrix} \quad (3)$$

where i=2, ..., N−1, and j=2, ..., M−1. In some embodiments, the detection module 18 determines the sharpness values from the edge filter output values $E_x(i,j)$, $E_y(i,j)$ in accordance with equation (4):

$$sharpness = \frac{1}{(N-2)\cdot(M-2)} \cdot \left( \sum_{i=2}^{N-1} \sum_{j=2}^{M-1} (|E_x(i, j)| + |E_y(i, j)|) \right) \quad (4)$$

The detection module 18 detects the blank video frames by thresholding the brightness parameter values with a threshold $T_B$, to detect dark frames, and thresholding the sharpness parameter values with a threshold $T_S$, to detect uniformly colored frames. The thresholds $T_B$ and $T_S$ may be determined empirically. If brightness<$T_B$ or sharpness<$T_S$ for a current video frame, the detection module 18 labels the current frame as a blank video frame.

C. Detecting Audio Boundary Events

In some of the embodiments that are described in detail above, the audio boundary events correspond to the occurrence of silence periods in the video data 12. In some of these embodiments, the detection module 18 detects silence periods in the video data 12 as follows.

The detection module 18 computes the short-time energy function of the audio data 24 in accordance with equation (5):

$$E_n = \frac{1}{N} \sum_m [x(m)w(n-m)]^2 \quad (5)$$

where x(m) is the discrete time audio signal, m is time index of the audio sample, n is time index of the short-time energy, and w(m) is a rectangle window, i.e.

$$w(m) = \begin{cases} 1 & 0 \le m \le N-1 \\ 0 & \text{otherwise} \end{cases} \quad (6)$$

where N is length of the window. The short-term energy function $E_n$ provides a convenient representation of the amplitude variation of the audio data 24 over time. In some embodiments, the parameter $E_n$ is computed every 10-20 milliseconds, which translates to a computation rate of once every 100 audio samples for an audio data sampling rate of 8000 Hz. The window length N typically is larger than the audio sampling interval so that there is an overlap between neighboring audio frames. Thus, in some exemplary embodiments in which $E_n$ is computed every 100 samples, the window length is set to 150 samples.

Figure 8:
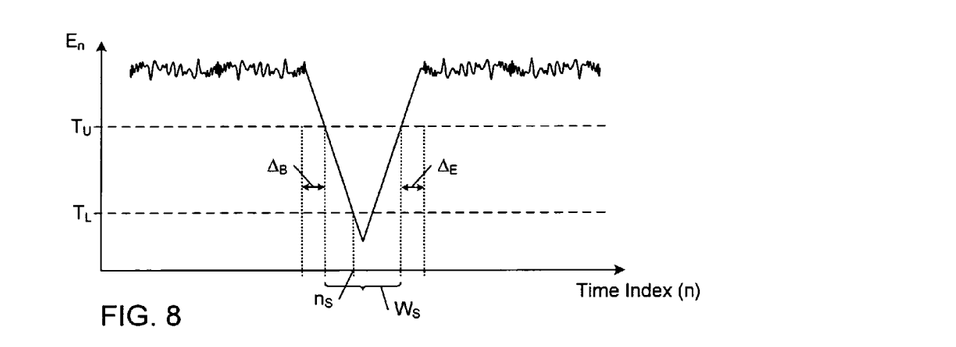
FIG. 8 is a devised graph of short-term energy of an exemplary audio signal plotted as a function of time.

Referring to FIG. 8, in some embodiments, the detection module 18 detects periods of silence in the audio data 24 by thresholding the computed short-term energy parameter values $E_n$ with upper and lower thresholds $T_U$ and $T_L$, where $T_U$>$T_L$. The detection module 18 detects a silence period whenever the energy parameter value $E_n$ is lower than the lower threshold $T_L$. For illustrative purposes, the times when the energy parameter value $E_n$ is lower than the lower threshold $T_L$ are demarcated with the reference $n_S$. The detection module 18 locates the window $W_S$ around $n_S$ within which all energy parameter values $E_n$ are lower than the upper threshold $T_U$. The window $W_S$ is the detected silence period.

In some embodiments, the boundaries of the window $W_S$ of detected silence may be expanded by $\Delta_B$ and $\Delta_E$, respectively, to increase the sensitivity of silence detection. In some of these embodiments, the respective values of $\Delta_B$ and $\Delta_E$ are in the range of 0-100 milliseconds.

D. Detecting Commercial Content Transition Events

In some of the embodiments that are described in detail above, the commercial content transition events correspond to the occurrences of one or more of the following detected events in the video data 12: the occurrence of static video frames; high shot cut rate transitions; sudden changes in audio content; and sudden changes in speech speed.

1. Detecting Static Video Frames

In some embodiments, the detection module 18 detects the occurrence of static video frames in the video data 12 as follows. The detection module 18 computes the color layout difference between consecutive video frames and compares the computed difference value with a threshold color layout difference value. The detection module 18 labels two video frames as static frames if the color layout difference between the video frames is below the threshold color layout difference value.

There are many different ways in which the detection module 18 may determine the color layout of a video frame. In some embodiments, the detection module 18 divides each video frame into a number of blocks. The block size may depend on the size of the video frames and the available computing and memory resources. For video frame size of 720 pixels by 480 pixels, the height and width of each block typically are within the range of 10-50 pixels. An exemplary block size for a video frame size of 720 pixels by 480 pixels is 18 pixels by 12 pixels, in which case there are 40×40 blocks in each video frame.

The detection module 18 computes the average color of each block. In embodiments in which the color values are defined in the RGB color space, the detection module 18 computes the average red value, the average greed value, and the average blue value for each block. The detection module 18 computes the color layout difference between two video frames, by computing the average absolute difference of the average R, G, B values for corresponding blocks in the two video frames. The absolute differences between the R, G, B values for block n of video frames i+1 and i are given by:

$$\Delta R_{i+1,i,n} = |R_{i+1,n} - R_{i,n}| \quad (7)$$

$$\Delta G_{i+1,i,n} = |G_{i+1,n} - G_{i,n}| \quad (8)$$

$$\Delta B_{i+1,i,n} = |B_{i+1,n} - B_{i,n}| \quad (9)$$

where n=1, ..., N and N is the total number of blocks in each video frame. The average absolute difference of the average color values for block n of video frames i+1 and i is given by equation (10):

$$\overline{\Delta}_{i+1,i,n} = \frac{\Delta R_{i+1,i,n} + \Delta G_{i+1,i,n} + \Delta B_{i+1,i,n}}{3} \quad (10)$$

For each pair of consecutive video frames, the detection module 18 compares the largest average difference value $\overline{\Delta}_{i+1,i,MAX}$ to the threshold color layout difference value. If $\overline{\Delta}_{i+1,i,MAX}$ is lower than the threshold, then the frames i+1 and i are labeled as static frames.

For each series of consecutive static frames, the detection module 18 defines a respective static frame period by recording the starting and ending points of the series.

In some embodiments, instead of computing the color layout difference for every frame, the color layout difference may be computed every G frames, where G has an integer value greater than one.

2. Detecting High Shot Cut Rate Transitions

In some embodiments, the detection module 18 detects high cut rate transitions in the video data 12 as follows. The detection module 18 detects shot changes based on the color histogram difference between adjacent video frames.

There are many different ways in which the detection module 18 may determine the color histogram of a video frame. In some embodiments, the detection module 18 compute the color histogram of a video frame by deriving a respective color code from the R, G, B values of each pixel. For example, in one exemplary approach a six-bit color code that consists of the two most significant bits of R, the two most significant bits of G, and the two most significant bits of B. The detection module 18 computes the color histogram by counting the number of pixels for each color code value. When the color code is six-bit, there are sixty-four possible values of it, thus, the color histogram has sixty-four bins, and the number of pixels in each bin is counted.

The color histogram difference between two consecutive frames i and i+1 is defined as:

$$diff_i = \sum_{n=1}^{K} |hist_{i+1}(n) - hist_i(n)| \quad (11)$$

where $hist_{i+1}$ and $hist_i$ are histogram of the $i+1^{th}$ and the $i^{th}$ frames, respectively. The parameter K is the number of bins in the histogram.

In some embodiments, the detection module detects a shot cut in the video data 12 each time the color histogram difference exceeds a threshold color histogram difference value. The detection module 18 then computes the average shot cut rate within a sliding window and compares the average shot cut rate with a shot cut rate threshold. The sliding window that is used to compute the average shot cut rate typically has a length that is in the range of 10-15 seconds, which corresponds to 240-360 frames when the video frame rate is twenty-four frames per second. The detection module 18 labels the times when the average shot cut rate exceeds the cut rate threshold as high cut rate transitions.

3. Detecting Sudden Changes in Audio Content

In some embodiments, the detection module 18 detects sudden audio content changes in the video data 12 based on audio changes in at least one of the time domain and the spectral domain that exceed respective threshold values. In some embodiments, the detection module 18 detects sudden audio changes in the time domain based on dramatic changes in the energy level or amplitude of the audio data 24 in the time domain. In some embodiments, the detection module 18 detects sudden audio changes in the spectral domain based on dramatic changes in the energy distribution among frequency bands in the audio data 24.

Figure 9:
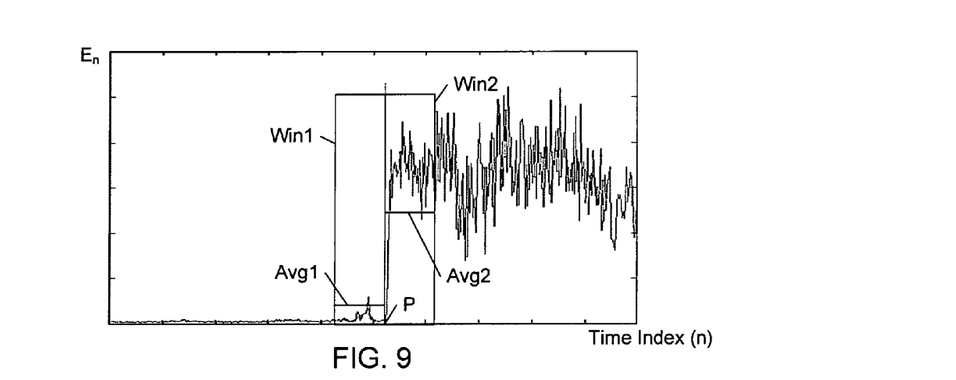
FIG. 9 is a devised graph of short-term energy of an exemplary audio signal plotted as a function of time along with two sampling windows superimposed on the graph.

Referring to FIG. 9, in some embodiments, the detection module 18 detects sudden audio changes in the time domain based on dramatic changes in the short-term energy level $E_n$ of the audio waveform in the time domain as follows. The short-term energy function $E_n$ is defined in equation (5) above. In this approach, the detection module 18 computes two average short-time energy parameter values Avg1 and Avg2 from portions of the audio data 24 in two sliding windows Win1 and Win2, which typically are about one to two seconds long. The two sliding windows Win1 and Win2 are positioned adjacent to each other and are moved together as a unit. Whenever the difference between Avg1 and Avg2 exceeds a predetermined energy change threshold, the detection module 18 detects a sudden change in the audio content. The detection module 18 records the time at the edge between the two windows (i.e., the point P in FIG. 9) as the time of the detected sudden audio content change.

Figure 10:
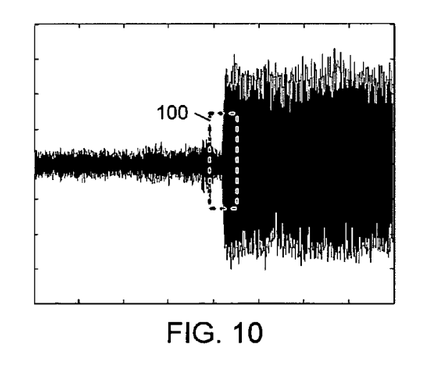
FIG. 10 is a time domain graph of the amplitude of an audio signal plotted as a function of time.

Referring to FIG. 10, in some embodiments, the detection module 18 detects sudden audio content changes in the time domain based on dramatic changes in the amplitude of the audio waveform in the time domain. In this approach, the detection module 18 computes two average audio amplitude values from portions of the audio data 24 in two sliding windows, which are analogous to the sliding windows described in the preceding paragraph. Whenever the difference between average audio amplitude values exceeds a predetermined audio volume change threshold, the detection module 18 detects a sudden change in the audio content. The detection module 18 records the time at the edge between the two windows as the time of the detected sudden audio content change. In FIG. 10, the box 100 is superimposed over an abrupt change in audio volume, indicating a scene change in the middle region of the audio data 24.

Figure 11:
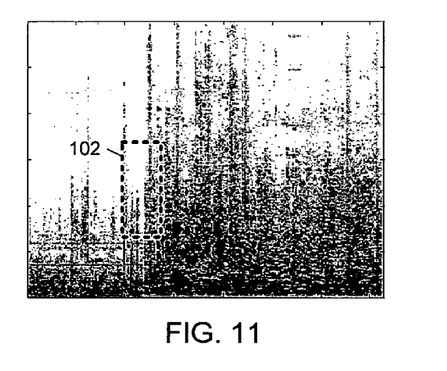
FIG. 11 is a spectrogram of an audio signal showing a two-dimensional representation of audio intensity, in different frequency bands, over time.

Referring to FIG. 11, in some embodiments, the detection module 18 detects sudden audio changes in the spectral domain based on dramatic changes in the energy distribution among frequency bands in the audio data 24. In this approach, the detection module 18 detects a sudden change in the audio content whenever there is a change in the frequency content (i.e., the frequency energy distribution) in the audio data 24. In FIG. 11, a scene change is indicated by the box 102 in the middle of the spectrogram. The spectral content of the audio data 24 preceding the box 102 is dominated by low frequency components, whereas the spectral content of the audio data 24 in the scene following the box 102 has significant components in the low and mid-frequency ranges. The detection module detects the change in the frequency composition of the audio data 24 as a sudden audio content change.

4. Detecting Sudden Changes in Speech Speed

In some embodiments, the detection module 18 detects sudden changes in speech speed in the video data 12 as follows.

The detection module 18 initially detects speech content within the audio data 24. There are many ways in which the detection module 18 may detect speech. In one approach, the detection module 18 generates a spectrogram of the audio data 24 by computing a frequency transform (e.g., the fast Fourier transform (FFT)) of the audio data 24. The detection module 18 then detects speech harmonic components in the spectrogram. In this process, the detection module 18 compares the spectrogram to a set of predetermined speech harmonics rules and thresholds and detects speech whenever the spectrogram contains a speech fundamental frequency and harmonics thereof. In some embodiments, the detection module 18 may determine that the energy content and zero-crossing rate (ZCR) values for the audio data 24 exceed respective thresholds before detecting speech content in the audio data 18.

In the context of discrete time audio, a zero-crossing is detected if successive samples have different signs. In this way, the ZCR measures the frequency content of the audio data 24. In some embodiments, the detection module determines the $Z_n$ in accordance with the following definition:

$$Z_n = \frac{1}{2} \cdot \sum \{\text{sgn}[x(m)] - \text{sgn}[x(m-1)]\} \cdot w(n-m) \quad (12)$$

where $$\text{sng}[x(m)] = \begin{array}{ll} +1 & x(m) \geq 0 \\ -1 & x(m) < 0 \end{array} \quad (13)$$

and $$w(m) = \begin{array}{ll} 1 & 0 \leq n \leq H-1 \\ 0 & \text{otherwise} \end{array} \quad (14)$$

where H is the length of the rectangular window w(m). In some embodiments, the parameter $Z_n$ is computed every 10-20 milliseconds and H is set to a length that is longer than the $Z_n$ computation interval.

In other embodiments, the detection module may detect speech in the audio data 24 using speech recognition approaches, such as explicit speech endpoint detection methods, implicit speech endpoint detection methods, and hybrid speech endpoint detection methods.

In some embodiments, the detection module 18 determines a respective measure of the average speech speed in the audio data 24 within a pair of adjacent sliding windows. The detection module 18 may determine the average speech speed by counting the number of words, syllables, or phonemes in the speech segments contained within the windows using a speech processing system (e.g., a speech recognition engine or the like) and dividing by the length of the windows. Whenever the difference between average speech speed measures exceeds a predetermined threshold, the detection module 18 detects a sudden change in the speech speed.

IV. CONCLUSION

The embodiments that are described herein are capable of detecting the boundaries of commercial content and program content in video data with high accuracy and efficiency.

Other embodiments are within the scope of the claims.

What is claimed is:

1. A video data processing method, comprising:
   extracting visual parameter values and audio parameter values from the video data;
   detecting in the video data visual boundary events associated with respective ones of the extracted visual parameter values that satisfy at least one visual boundary condition, audio boundary events associated with respective ones of the extracted audio parameter values that satisfy at least one audio boundary condition, and commercial content transition events associated with respective ones of the extracted visual and audio parameter values that satisfy at least one condition that distinguishes commercial type content from program type content;
   determining candidate commercial blocks of consecutive commercial content in the video data from a combination of the detected visual boundary events and the detected audio boundary events, each of the candidate commercial blocks being defined between respective candidate starting and ending boundary points; and
   adjusting ones of the starting and ending boundary points of the candidate commercial blocks based on occurrence of one or more of the detected commercial content transition events within temporal windows respectively encompassing the starting and ending points.

2. The method of claim 1, wherein the detecting comprises detecting visual boundary events corresponding to blank video frames in the video data.

3. The method of claim 2, wherein the detecting of blank frames comprises detecting black video frames in the video data.

4. The method of claim 2, wherein the detecting comprises detecting audio boundary events corresponding to silence in the video data.

5. The method of claim 4, wherein the determining comprises labeling as commercial boundary points ones of the detected visual boundary events corresponding to blank video frames that coincide with respective ones of the detected audio boundary events corresponding to silence.

6. The method of claim 4, the determining comprises labeling as commercial boundary points three or more consecutive ones of the detected visual boundary events corresponding to two or more adjacent pairs of blank video frames, wherein the blank video frames in each pair are separated by a respective period approximately an integer multiple of fifteen seconds in length.

7. The method of claim 1, wherein the determining comprises identifying commercial boundary points in the video data from the combination of the detected visual boundary events and the detected audio boundary events, and clustering ones of the identified commercial boundary points into the candidate commercial blocks.

8. The method of claim 7, wherein the clustering comprises merging into respective ones of the candidate commercial blocks periods in the video data between adjacent ones of the identified commercial boundary points based on at least one temporal clustering threshold.

9. The method of claim 1, wherein the adjusting comprises adjusting ones of the starting and ending points of the candidate commercial blocks to respective ones of the detected commercial content transition events within corresponding ones of the temporal windows.

10. The method of claim 9, wherein the detecting comprises detecting commercial content transition events corresponding to still frames in the video data, and the adjusting comprises adjusting ones of the starting and ending points of the candidate commercial blocks to respective ones of the detected commercial content transition events corresponding to still frames within corresponding ones of the temporal windows.

11. The method of claim 9, wherein the detecting comprises detecting commercial content transition events corresponding to shot cut rate transitions in the video data, and the adjusting comprises adjusting ones of the starting and ending points of the candidate commercial blocks to respective ones of the detected commercial content transition events corresponding to shot cut rate transitions within corresponding ones of the temporal windows.

12. The method of claim 9, wherein the detecting comprises detecting commercial content transition events corresponding to transitions in audio content continuity in the video data, and the adjusting comprises adjusting ones of the starting and ending points of the candidate commercial blocks to respective ones of the detected commercial content transition events corresponding to transitions in audio content continuity within corresponding ones of the temporal windows.

13. The method of claim 9, wherein the detecting comprises detecting commercial content transition events corresponding to transitions in speech speed in the video data, and the adjusting comprises adjusting ones of the starting and ending points of the candidate commercial blocks to respective ones of the detected commercial content transition events corresponding to transitions in speech speed within corresponding ones of the temporal windows.

14. A video data processing system, comprising:
a detection module operable to
extract visual parameter values and audio parameter values from the video data;
detect in the video data visual boundary events associated with respective ones of the extracted visual parameter values that satisfy at least one visual boundary condition, audio boundary events associated with respective ones of the extracted audio parameter values that satisfy at least one audio boundary condition, and commercial content transition events associated with respective ones of the extracted visual and audio parameter values that satisfy at least one condition that distinguishes commercial type content from program type content; and
a commercial block identification module operable to
determine candidate commercial blocks of consecutive commercial content in the video data from a combination of the detected visual boundary events and the detected audio boundary events, each of the candidate commercial blocks being defined between respective candidate starting and ending boundary points, and
adjust ones of the starting and ending boundary points of the candidate commercial blocks based on occurrence of one or more of the detected commercial content transition events within temporal windows respectively encompassing the starting and ending points.

15. The system of claim 14, wherein the detection module is operable to detect visual boundary events corresponding to blank video frames in the video data.

16. The system of claim 15, wherein the detection is operable to detect audio boundary events corresponding to silence in the video data.

17. The system of claim 14, wherein the commercial block identification module is operable to identify commercial boundary points in the video data from the combination of the detected visual boundary events and the detected audio boundary events, and clustering ones of the identified commercial boundary points into the candidate commercial blocks.

18. The system of claim 14, wherein the commercial block identification module is operable to adjust ones of the starting and ending points of the candidate commercial blocks to respective ones of the detected commercial content transition events within corresponding ones of the temporal windows.

19. The system of claim 18, wherein:
the detection is operable to detect in the video data commercial content transition events corresponding to at least one of still frames, shot cut rate transitions, transitions in audio content continuity, and transitions in speech speed, and
the commercial block identification module is operable to adjust ones of the starting and ending points of the candidate commercial blocks to respective ones of the detected content characterizing events corresponding to one or more of still frames, high shot cut rate transitions, sudden audio content changes, and high speech speed transitions within corresponding ones of the temporal windows.

20. A non-transitory computer-readable medium storing program instructions that, when executed by a computer system, cause the computer system to perform operations comprising:
extracting visual parameter values and audio parameter values from the video data;
detecting in the video data visual boundary events associated with respective ones of the extracted visual parameter values that satisfy at least one visual boundary condition, audio boundary events associated with respective ones of the extracted audio parameter values that satisfy at least one audio boundary condition, and commercial content transition events associated with respective ones of the extracted visual and audio parameter values that satisfy at least one condition that distinguishes commercial type content from program type content;
determining candidate commercial blocks of consecutive commercial content in the video data from a combination of the detected visual boundary events and the detected audio boundary events, each of the candidate commercial blocks being defined between respective candidate starting and ending boundary points; and
adjusting ones of the starting and ending boundary points of the candidate commercial blocks based on occurrence of one or more of the detected commercial content transition events within temporal windows respectively encompassing the starting and ending points encompassing one or more of the detected commercial content transition events.

* * * * *